US012617309B2

(12) United States Patent
Stenberg et al.

(10) Patent No.: US 12,617,309 B2
(45) Date of Patent: May 5, 2026

(54) CONTROLLER, COMPUTER-IMPLEMENTED FOR DYNAMICALLY DISTRIBUTING ELECTRIC CURRENT, COMPUTER PROGRAM AND NON-VOLATILE DATA CARRIER

(71) Applicant: Waybler AB, Solna (SE)

(72) Inventors: Lars Stenberg, Handen (SE); Peter Magnusson, Upplands Väsby (SE)

(73) Assignee: Waybler AB, Solna (SE)

( * ) Notice: Subject to any disclaimer, the term of this patent is extended or adjusted under 35 U.S.C. 154(b) by 398 days.

(21) Appl. No.: 18/196,037

(22) Filed: May 11, 2023

(65) Prior Publication Data

US 2023/0400829 A1 Dec. 14, 2023

(30) Foreign Application Priority Data

Jun. 14, 2022 (SE) .................................... 2250715-6

(51) Int. Cl.
 B60L 53/63 (2019.01)
 B60L 53/62 (2019.01)
 (Continued)

(52) U.S. Cl.
 CPC .............. B60L 53/63 (2019.02); B60L 53/62 (2019.02); B60L 53/67 (2019.02); B60L 53/68 (2019.02); H02J 7/04 (2013.01); *H02J 2203/10* (2020.01)

(58) Field of Classification Search
 CPC .......... B60L 53/63; B60L 53/62; B60L 53/67; B60L 53/68; H02J 7/04; H02J 2203/10
 See application file for complete search history.

(56) References Cited

U.S. PATENT DOCUMENTS

2009/0048718 A1 2/2009 Richard et al.
2015/0165917 A1 6/2015 Robers et al.
(Continued)

FOREIGN PATENT DOCUMENTS

EP 2622703 A2 8/2013
EP 2751902 A1 7/2014
(Continued)

OTHER PUBLICATIONS

Waybler AB, Swedish Patent Application No. 2250715-6, Swedish Search Report, Dec. 22, 2022.
(Continued)

*Primary Examiner* — Michael W Choi
(74) *Attorney, Agent, or Firm* — Moore & Van Allen PLLC; W. Kevin Ransom

(57) ABSTRACT

Electric current is dynamically distributed to vehicles, which each is connected to a respective consumer node in a distribution network receiving a total amount of incoming electric current via a root interface. Current is allotted to each node in the distribution network according to a step-wise procedure, wherein amounts of current is gradually allotted to the nodes until all of the total amount of electric current has been allotted, or at least one threshold criterion is fulfilled. A respective amount of current requested by each consumer node is repeatedly reassessed, and if for a particular consumer node, a requested amount of current is lower than an amount of current allotted to the node, the amount of electric current allotted to the particular consumer node is decreased to the amount of current requested by that node.

17 Claims, 2 Drawing Sheets

(51) Int. Cl.
    *B60L 53/67*        (2019.01)
    *B60L 53/68*        (2019.01)
    *H02J 7/04*         (2006.01)

(56)            References Cited

U.S. PATENT DOCUMENTS

| | | | |
|---|---|---|---|
| 2015/0280436 A1 | 10/2015 | Weckx et al. | |
| 2015/0340889 A1 | 11/2015 | Appelbaum et al. | |
| 2017/0274792 A1 | 9/2017 | Vaughan et al. | |
| 2021/0162881 A1* | 6/2021 | Baxter | G05B 13/02 |
| 2023/0140514 A1* | 5/2023 | De Boer | B60L 53/67 |
| | | | 320/109 |
| 2023/0415600 A1* | 12/2023 | Sankar | H02J 7/0013 |

FOREIGN PATENT DOCUMENTS

| | | | |
|---|---|---|---|
| EP | 2907211 | A2 | 8/2015 |
| EP | 3702201 | A1 | 9/2020 |
| EP | 3710306 | A1 | 9/2020 |
| GB | 2577048 | A | 3/2020 |
| GB | 2593524 | A | 9/2021 |
| WO | 2012047576 | A2 | 4/2012 |
| WO | 2013032519 | A1 | 3/2013 |
| WO | 2014057133 | A2 | 4/2014 |
| WO | 2019097115 | A1 | 5/2019 |

OTHER PUBLICATIONS

Waybler AB, European Patent Application No. 23160703.7, Extended European Search Report, Nov. 29, 2023.

* cited by examiner

CONTROLLER, COMPUTER-IMPLEMENTED FOR DYNAMICALLY DISTRIBUTING ELECTRIC CURRENT, COMPUTER PROGRAM AND NON-VOLATILE DATA CARRIER

CROSS-REFERENCE TO RELATED APPLICATION

This application claims priority to Swedish Patent Application No. 2250715-6 filed Jun. 14, 2022, of the same title; the contents of which is hereby incorporated by reference.

TECHNICAL FIELD

The present invention relates generally to the provision of electric energy to land based vehicles. Especially, the invention relates to a controller for dynamically distributing electric current to vehicles according to the preamble of claim 1 and a corresponding computer-implemented method. The invention also relates to a computer program and a non-volatile data carrier storing such a computer program.

BACKGROUND

The use of electrically powered vehicles has increased tremendously during the last decade. This places a very high pressure on the infrastructure for distributing electric current to these vehicles. Naturally, in such a scenario, it is important that each part of the infrastructure is used as efficiently as possible. The prior art contains various kinds of charging systems aiming at solving this problem.

For example, EP 2 751 902 shows a battery charging station and method of use, where the charging station includes a plurality of charge ports and a plurality of power stages where each stage provides a portion of the station's maximum available charging power. A switching system couples the output of the power stages to the charging ports based on charging station and vehicle conditions as well as a predefined set of power distribution rules. Current charging station and vehicle conditions may include vehicle arrival time, usage fees, vehicle/customer priority information, state-of-charge (SOC) and intended departure time. The method includes the steps of monitoring and determining battery charging station conditions, determining power distribution for the battery charging station and the charging ports in response to the current charging conditions and in accordance with a predefined set of power distribution rules, and coupling the power stages to the charging ports in accordance with the power distribution.

US 2015/0340889 discloses a power management system that can smartly allocate the available power at a location to support more electric vehicles than would otherwise be possible. Power managers can intelligently allocate that power based on the real-time needs of vehicles. A smart energy distribution system can estimate each vehicle's current charge level and use such information to efficiently provide electric vehicle charging. The system can respond dynamically to vehicle charge levels, current readings, and/ or electrical mains readings, allocating more current where it is needed. The charger profiles can include historic charge cycle information, which can be analyzed under a set of heuristics to predict future charging needs. A local electric vehicle charging mesh network can be provided, which transmits data packets among short-range transceivers of multiple power managers. The local electric vehicle charging mesh network can be connected to a remote server via a cellular connection. The power managers and the local electric vehicle charging mesh network can intelligently allocate power to multiple electric vehicles.

However, none of the known systems is capable of allocating electric power to the vehicles in such a way that the distribution infrastructure is used to its full potential.

SUMMARY

The object of the present invention is to solve the above problem and offer an improved solution for delivering electric current to vehicles.

According to one aspect of the invention, the object is achieved by a controller for dynamically distributing electric current to vehicles that are connected to a respective consumer node in a distribution network receiving a total amount of incoming electric current via a root interface. The distribution network contains a set of intermediate nodes being hierarchically organized in a topmost level including at least one node configured to receive electric current directly from the root interface and at least one subordinated level including at least one node configured to receive electric current from a node at the topmost level, or a node at a higher subordinated level. The controller is configured to allot electric current to each node in the distribution network according to a stepwise procedure involving at least one allocation step per node in the distribution network, wherein in each of the at least one allocation step an amount of electric current is allotted to the node. The controller is configured to continue the stepwise procedure either until all of the total amount of electric current has been allotted, or at least one threshold criterion is fulfilled. Moreover, the controller is configured to repeatedly reassess a respective amount of electric current requested by each of the consumer nodes. If for a particular consumer node, a requested amount of electric current is lower than an amount of electric current allotted to the node, the controller is configured to decrease the amount of electric current allotted to the particular consumer node to the amount of electric current requested by that node.

The above controller is advantageous because it enables electric current to be allocated dynamically to match a typical charging cycle of EVs (Electric vehicles) and PHEVs (Plug-in hybrid electric vehicles), wherein the batteries draw less and less current when approaching a fully charged state. Consequently, the charging resources can be allocated in a fair manner and in agreement with a prioritizing scheme.

According to one embodiment of this aspect of the invention, the consumer nodes constitute a lowest subordinated level in the distribution network. The controller is specifically configured to effect the stepwise procedure by: starting at the root interface, traversing from the root interface to a first node at the topmost level, continuing traversing from the first node at the topmost level to a first node at each subordinated level below the topmost level until reaching the lowest subordinated level in the distribution network, and here, the controller is configured to allot a first predefined amount of electric current, say 6 Ampere, to a first node at the lowest subordinated level below the first node at the topmost level. This strategy is advantageous because the distribution network is evenly loaded throughout the distribution process.

According to another embodiment of this aspect of the invention, the controller is further configured to effect the stepwise procedure by, after having allotted the first predefined amount of electric current to the first node at the lowest subordinated level below the first node at the topmost level performing the steps: (a) returning to the root interface, (b) traversing from the root interface to a first previously not traversed node at the topmost level, (c) continuing traversing from the first previously not traversed node at the topmost level to a respective first previously not traversed node at each subordinated level below the topmost level until reaching the lowest subordinate level, and (d) allotting another round of the first predefined amount of electric current to a first node at the lowest subordinated level below the first previously not traversed node at the topmost level. Thereby, it is possible to load the distribution network evenly while distributing the incoming electric current to the vehicles in an impartial manner.

According to yet another embodiment of this aspect of the invention, the controller is further configured to effect the stepwise procedure by, after having allotted said another round of the predefined amount of electric current to the first node at the lowest subordinated level below the first previously not traversed node at the topmost level: repeating the steps (a) to (d) until each node at the lowest subordinated level has been allotted the first predefined amount of electric current. Thus, electric current is began to be fed to each vehicle as early as possible.

According to still another embodiment of this aspect of the invention, the controller is configured to effect the stepwise procedure by, after having allotted the first predefined amount of electric current to each node at the lowest subordinated level: returning to the root interface, traversing from the root interface to the first node at the topmost level, continuing traversing from the first node at the topmost level to a first node at each subordinated level below the topmost level until reaching the lowest subordinated level, and allotting an increased amount of electric current to the first node at the lowest subordinated level below the first node at the topmost level. Thus, it is ensured that the distribution network is evenly loaded while the incoming electric current is distributed to the vehicles in an impartial manner.

According to another embodiment of this aspect of the invention, the controller is configured to effect the stepwise procedure by, after having allotted the increased amount of electric current to the first node at the lowest subordinated level below the first node at the topmost level performing the steps: (i) returning to the root interface, (ii) traversing from the root interface to a first previously not traversed node at the topmost level, (iii) continuing traversing from the first previously not traversed node at the topmost level to a respective first previously not traversed node at each subordinated level below the topmost level until reaching the lowest subordinated level, (iv) allotting the increased amount of electric current to a first node at the lowest subordinated level below the first previously not traversed node at the topmost level, and repeating the steps (i) to (iv) until either a sum of electric current allotted to the consumer nodes is equal to the total amount of incoming electric current, or at least one of following first and second threshold criteria is fulfilled. The first threshold criterion is fulfilled if such an amount of electric current has been allotted to at least one of the consumer nodes that at least one node at the least one subordinated level has reached a capacity limit for an amount of electric current being possible to transfer through that node. The second threshold criterion is fulfilled if each of the consumer nodes has been allotted a respective maximum amount of electric current. Thereby, it is guaranteed that each vehicle receives as much electric current as possible.

According to yet another embodiment of this aspect of the invention, before allotting electric current to a node in the set of nodes, the controller is configured to execute a prioritizing procedure according to which a vehicle with an electric load in the form of an engine heater is given priority over a vehicle with an electric load in the form of a rechargeable battery. As a result, chances improve that engine heaters receive adequate electric current. This is generally preferable, for example from an environmental point of view.

According to still another embodiment of this aspect of the invention, the prioritizing procedure further involves giving priority to a vehicle that has not yet been allotted electric current during a predetermined period of time over a vehicle that has already been allotted electric current during the predetermined period of time. Thereby, the impartial distribution of electric current is expedited.

According to a further embodiment of this aspect of the invention, the consumer nodes contain first and second subgroups, and the controller is configured to exclusively allot electric current to consumer nodes in the second subgroup after that each of the consumer nodes in the first subgroup has been allotted a respective maximum amount of electric current. Consequently, premium clients can be guaranteed top quality of service.

According to another embodiment of this aspect of the invention, the consumer nodes contains at least one non-loading consumer node, which at some point in time has requested a zero amount of electric current. Here, the controller is configured to exclusively enable any of the non-loading consumer nodes to be allotted electric current if each of the other consumer nodes has been allotted a respective maximum amount of electric current. This strategy is advantageous because it avoids unnecessary inquiring of vehicles that do not need electric power. At the same time, it is not excluded that also vehicles that have not indicated any need for electric power are offered a second chance.

According to another aspect of the invention, the object is achieved by a computer-implemented method for dynamically distributing electric current to vehicles, which each is connected to a respective consumer node in a distribution network receiving a total amount of incoming electric current via a root interface. The distribution network has a set of intermediate nodes being hierarchically organized in a topmost level including at least one node configured to receive electric current directly from the root interface and at least one subordinated level including at least one node configured to receive electric current from a node at the topmost level, or a node at a higher subordinated level. The method, which is performed in at least one processor, involves allotting electric current to each node in the distribution network according to a stepwise procedure involving at least one allocation step per node in the distribution network, wherein in each of the at least one allocation step an amount of electric current is allotted to the node. The stepwise procedure is continued until either all of the total amount of electric current has been allotted, or at least one threshold criterion is fulfilled. The method further involves reassessing, repeatedly, a respective amount of electric current requested by each of the consumer nodes. If for a particular consumer node, a requested amount of electric current is lower than an amount of electric current allotted to the node, method involves decreasing the amount of electric current allotted to the particular consumer node to the amount of current requested by that node. The advantages of this method, as well as the preferred embodiments thereof are apparent from the discussion above with reference to the proposed controller.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
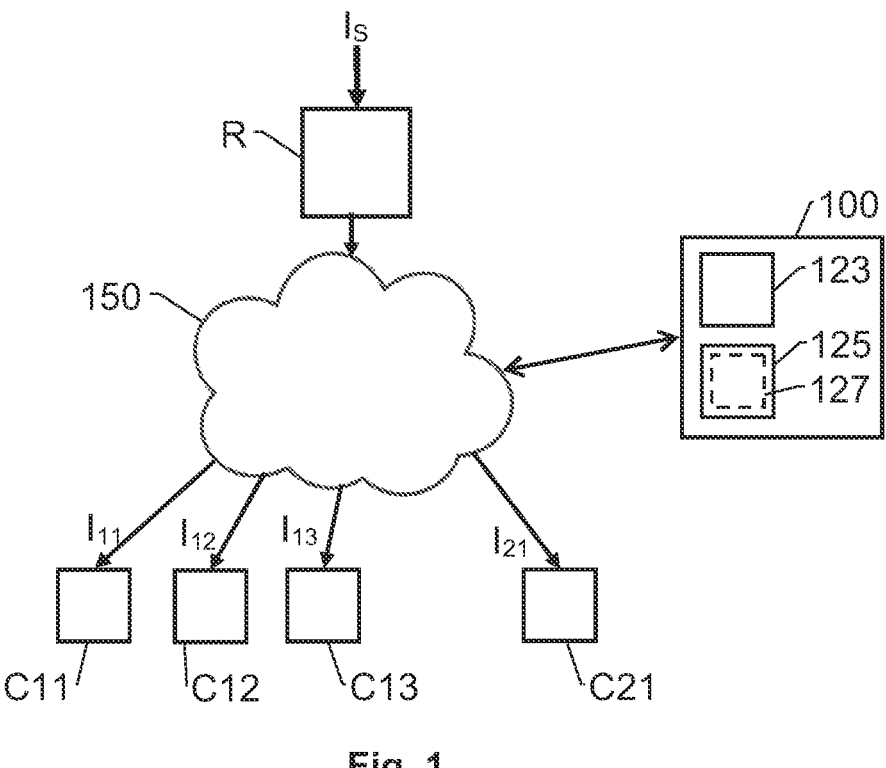
FIG. 1 shows a block diagram of a distribution network and a controller according to one embodiment of the invention.

In FIG. 1, we see a block diagram of a distribution network 150 and a controller 100 for dynamically distributing electric current to vehicles according to one embodiment of the invention.

Here, each vehicle (not shown) is presumed to be connected to a respective consumer node C11, C12, C13 and C21 in the distribution network 150.

A total amount of incoming electric current Is to be distributed is received via a root interface R to the distribution network 150. As will be explained in detail below, the distribution network 150 contains a set of intermediate nodes, which are hierarchically organized in a logical structure that may or may not correspond to a physical structure. Undoubtedly, each of the consumer nodes C11, C12, C13 and C21 corresponds to a physical node in the form of an outlet, or a charging station. Likewise, the root interface R has a physical equivalence. However, the distribution network may also contain a number of subordinated levels at which the nodes are strictly logical units, i.e. virtual nodes without any physical equivalence. For example, here, one physical node may contain two or more virtual nodes. Conversely, two or more physical nodes may represent a single virtual node.

Figure 2:
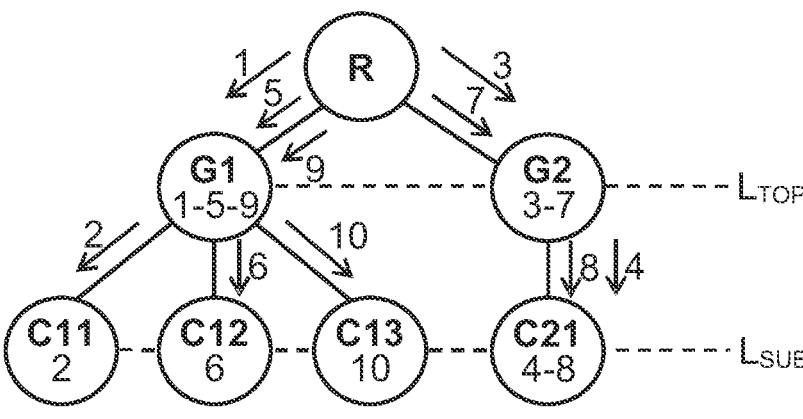
FIG. 2 schematically illustrates the method of dynamically distributing electric current to vehicles according to one embodiment of the invention.
Figures 3, 4:
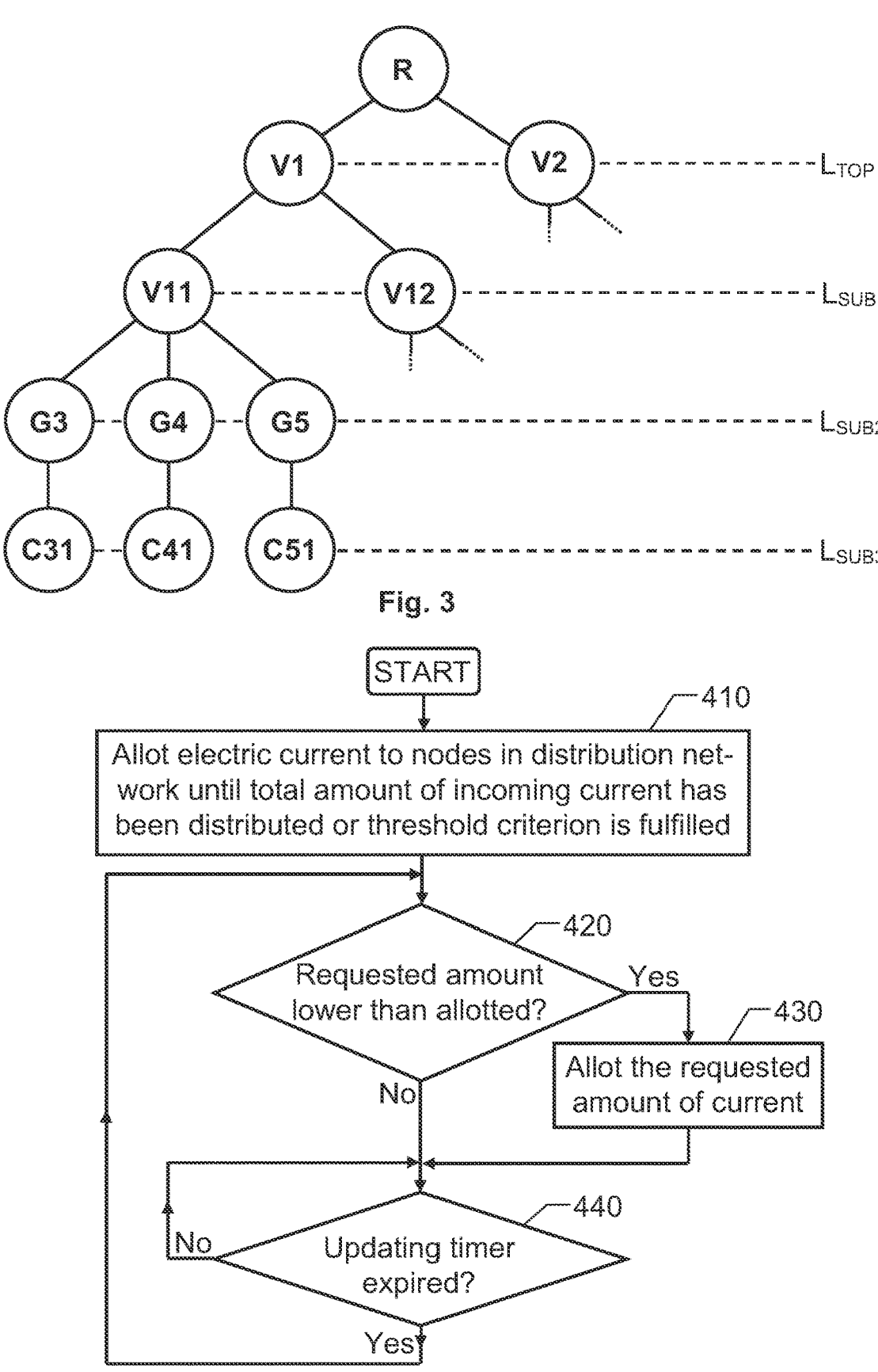
FIG. 3 illustrates, by means of an example, how the nodes of the distribution network may be logically organized according to the invention.
FIG. 4 illustrates, by means of a flow diagram, the general method according to the invention.

Nevertheless, referring now to FIGS. 2 and 3, the distribution network 150 is hierarchically organized with a topmost level $L_{TOP}$ receiving the total amount of incoming electric current Is from the root interface R and at least one subordinated level $L_{SUB1}$, $L_{SUB2}$ and $L_{SUB3}$ of which a lowest level is constituted by the consumer nodes, exemplified as C11, C12, C13 and C21 respectively in FIG. 2 and C31, C41 and C51 respectively in FIG. 3.

FIG. 2 shows a very simple distribution network 150, where the topmost level $L_{TOP}$ has two nodes G1 and G2 respectively, and a single subordinated level $L_{SUB}$ contains the consumer nodes C11, C12, C13 and C21. Specifically, the consumer nodes C11, C12 and C13 are connected to the node G1 and the consumer node C21 is connected to the node G2.

FIG. 3 shows a general distribution network 150, where the topmost level $L_{TOP}$ has two nodes in the form of V1 and V2 respectively. A first subordinated level $L_{SUB1}$ below the topmost level $L_{TOP}$ contains nodes V11 and V12 plus a number of not specifically illustrated nodes, a second subordinated level $L_{SUB2}$ below the first subordinated level $L_{SUB1}$ contains nodes G3, G4 and G5 plus a number of not specifically illustrated nodes, and a third subordinated level $L_{SUB3}$ below the second subordinated level $L_{SUB2}$ contains the consumer nodes C31, C41 and C51 plus a number of not specifically illustrated consumer nodes.

The controller 100 is configured to allot electric current to each node in the distribution network 150 according to a stepwise procedure that involves at least one allocation step per node in the distribution network 150. In each of the at least one allocation step, the controller 100 is configured to allot an amount of electric current to the node in question. The controller 100 is configured to continue the stepwise procedure until either all of the total amount of electric current Is has been allotted, or at least one threshold criterion is fulfilled.

Moreover, the controller 100 is configured to repeatedly reassess a respective amount of electric current requested by each of the consumer nodes C11, C12, C13, C21, C31, C41 and C51. If the controller 100 finds that, for a particular consumer node, the requested amount of electric current is lower than an amount of electric current presently allotted to the particular node, the controller 100 is configured to decrease the amount of electric current allotted to the particular consumer node, such that the amount of electric current allotted to the particular node is equal to the amount of electric current presently requested by the particular node. As a result, resources are freed up for use by one or more consumer nodes.

According to one embodiment of the invention, the controller 100 is configured to effect the stepwise procedure by:
starting at the root interface R,
traversing from the root interface R to a first node at the topmost level $L_{TOP}$,
continuing traversing from the first node at the topmost level $L_{TOP}$ to a first node at each subordinated level $L_{SUB}$ or $L_{SUB1}$ respectively below the topmost level $L_{TOP}$ until reaching the lowest subordinated level in the distribution network 150, and
allotting a first predefined amount of electric current to a first node at the lowest subordinated level below the first node at the topmost level $L_{TOP}$.

Preferably, after having allotted the first predefined amount of electric current to the first node at the lowest subordinated level below the first node at the topmost level $L_{TOP}$, the controller (100) is configured to effect the stepwise procedure by, performing the following steps:
(a) returning to the root interface R,
(b) traversing from the root interface R to a first previously not traversed node at the topmost level $L_{TOP}$,
(c) continuing traversing from the first previously not traversed node at the topmost level $L_{TOP}$ to a respective first previously not traversed node at each subordinated level $L_{SUB}$ below the topmost level $L_{TOP}$ until reaching the lowest subordinate level, and
(d) allotting another round of the first predefined amount of electric current to a first node at the lowest subordinated level below the first previously not traversed node at the topmost level $L_{TOP}$.

Further preferably, the controller 100 is configured to effect the stepwise procedure by, after having allotted said another round of the predefined amount of electric current to the first node at the lowest subordinated level below the first previously not traversed node at the topmost level $L_{TOP}$:

repeating the steps (a) to (d) until each node at the lowest subordinated level has been allotted the first predefined amount of electric current.

According to one embodiment of the invention, the controller 100 is further configured to effect the stepwise procedure by, after having allotted the first predefined amount of electric current to each node at the lowest subordinated level:

returning to the root interface R, traversing from the root interface R to the first node at the topmost level $L_{TOP}$, continuing traversing from the first node at the topmost level $L_{TOP}$ to a first node at each subordinated level below the topmost level $L_{TOP}$ until reaching the lowest subordinated level, and allotting an increased amount of electric current to the first node at the lowest subordinated level below the first node at the topmost level $L_{TOP}$.

Additionally, it is advantageous if the controller is configured to effect the stepwise procedure by, after having allotted the increased amount of electric current to the first node at the lowest subordinated level below the first node at the topmost level $L_{TOP}$ performing the steps:

returning to the root interface R, (ii) traversing from the root interface R to a first previously not traversed node at the topmost level $L_{TOP}$, (iii) continuing traversing from the first previously not traversed node at the topmost level $L_{TOP}$ to a respective first previously not traversed node at each subordinated level below the topmost level $L_{TOP}$ until reaching the lowest subordinated level, (iv) allotting the increased amount of electric current to a first node at the lowest subordinated level below the first previously not traversed node at the topmost level $L_{TOP}$, and repeating the steps (i) to (iv) until:

a sum of electric current allotted to the consumer nodes is equal to the total amount of incoming electric current Is, or at least one threshold criterion is fulfilled.

The threshold criterion may be fulfilled if such an amount of electric current has been allotted to at least one of the consumer nodes C11, C12, C13, C21, C31, C41 and/or C51 that at least one node at the least one subordinated level $L_{SUB}$, $L_{SUB2}$, $L_{SUB2}$, and/or $L_{SUB3}$ has reached a capacity limit for an amount of electric current that is possible to transfer through that node.

Alternatively, or additionally, the threshold criterion may be fulfilled if each of the consumer nodes C11, C12, C13, C21, C31, C41 and C51 has been allotted a respective maximum amount of electric current.

Now, referring again to FIG. 2, we will exemplify how the above procedure of dynamically distributing electric current to vehicles is implemented according to embodiments of the invention.

The controller 100 effects the stepwise procedure by starting at the root interface R and traversing therefrom to a first node at the topmost level $L_{TOP}$, i.e. G1. This step is designated by "1" in FIG. 2. Then, the controller 100 continues traversing from the first node G1 at the topmost level $L_{TOP}$ to a first node at the subordinated level $L_{SUB}$ below the topmost level $L_{TOP}$, i.e. the consumer node C11. In FIG. 2 this step is designated by "2". When the controller

100 reaches the lowest subordinated level $L_{SUB}$, which is represented by the to the consumer node C11, the controller allots a first predefined amount of electric current, say 10A, to the consumer node C11.

Third, after having allotted the first predefined amount of electric current to the consumer node C11, the controller 100 returns to the root interface R and traverses from the root interface R to a first previously not traversed node at the topmost level $L_{TOP}$, i.e. here the second node G2. This step is designated by "3" in FIG. 2. Fourth, the controller 100 continues traversing from the first previously not traversed node G2 at the topmost level $L_{TOP}$ to a respective first previously not traversed node at each subordinated level $L_{SUB}$ below the topmost level $L_{TOP}$ until reaching the lo west subordinate level $L_{SUB}$, i.e. the consumer node C21. This step is designated by "4" in FIG. 2. When the controller 100 thus reaches the lowest subordinated level $L_{SUB}$, the controller 100 allots another round of the first predefined amount of electric current to the consumer node C21.

Fifth, after having allotted said another round of the predefined amount of electric current to the consumer node C21, the controller 100 again returns to the root interface R. This time, however, there is no node at the topmost level $L_{TOP}$ that has not been traversed previously. Therefore, the controller 100 revisits the first node G1. This step is designated by "5" in FIG. 2.

Sixth, the controller 100 continues to a second node at the subordinated level $L_{SUB}$ below the topmost level $L_{TOP}$, i.e. the consumer node C16, and allots another round of the predefined amount of electric current to this node, which is designated by "6" in FIG. 2.

Seventh, after having allotted said another round of the predefined amount of electric current to the consumer node C12, the controller 100 returns to the root interface R once more. This time, the controller 100 traverses to the second node G2 at the topmost level $L_{TOP}$, which is designated by "7" in FIG. 2. Eighth, the controller 100 continues to the lowest subordinated level $L_{SUB}$, i.e. the consumer node C21 and allots another round of the predefined amount of electric current to this node. This is designated by "8" in FIG. 2.

Ninth, after having allotted said another round of the predefined amount of electric current to the consumer node C21, the controller 100 again returns to the root interface R, and traverses to the first node G1 at the topmost level $L_{TOP}$. This is designated by "9" in FIG. 2.

Tenth, the controller 100 continues to the lowest subordinated level $L_{SUB}$, i.e. the consumer node C13 and allots another round of the predefined amount of electric current to this node. This is designated "10" in FIG. 2. At this point, each node at the lowest subordinated level $L_{SUB}$, i.e. the consumer nodes C11, C12, C13 and C21 have been allotted at least one round of the predetermined amount of electric current. Specifically, the consumer nodes C11, C12 and C13 have been allotted one round each, whereas the consumer node C21 has been allotted two rounds of the predetermined amount of electric current.

According to one embodiment of the invention, if there is still a portion of the total amount of incoming electric current Is received via a root interface R that remains to allot, the controller 100 is configured to continue to traverse the nodes of the distribution network 150 as described above until all of the total amount of incoming electric current Is has been allotted. In FIG. 2, the would mean returning once more to the node G2 and continuing to the consumer node C21 for allotting a third round of the predetermined amount of electric current—provided that this node has requested such an amount of electric current. For clarity, however, this is not illustrated in FIG. 2.

FIG. 3 illustrates a general example of how the nodes of the distribution network 150 may be logically organized according to one embodiment of the invention. Here, the distribution network 150 has three subordinated levels below the topmost level $L_{TOP}$ in the form of $L_{SUB1}$, $L_{SUB2}$ and $L_{SUB3}$ respectively. For example, the topmost level $L_{TOP}$ and the subordinated level $L_{SUB1}$ may contain virtual nodes V1 and V2, and V11 and V12 respectively, whereas the subordinated levels $L_{SUB2}$ and $L_{SUB3}$ may contain physical nodes G3, G4 and G5, and C31, C41 and C51 respectively, the latter of which are also consumer nodes.

In addition to the above, it may be advantageous if before allotting electric current to any of the nodes in the set of nodes, the controller 100 is configured to execute a prioritizing procedure. For example, this may involve giving priority to a vehicle with an electric load in the form of an engine heater over a vehicle with an electric load in the form of a rechargeable battery. Thereby, in practice, the controller 100 allots electric current to all consumer nodes with engine-heater loads before allotting any electric current to the first consumer node with a rechargeable-battery load.

To ensure that all vehicles receive at least some electric current, it may further be preferable that the controller 100 employs a prioritizing procedure wherein priority is given to a vehicle that has not yet been allotted electric current during a predetermined period of time over a vehicle that has already been allotted electric current during the predetermined period of time. For example, if the consumer node C21 has received electric current for 10 minutes, while the consumer node C13 has not received any current at all, the controller 100 may allot electric current to the consumer node C13 and stop the delivery of electric current to the consumer node C21, at least temporarily.

Moreover, to enable different levels of service quality, according to one embodiment of the invention, the consumer nodes are divided into at least first and second subgroups representing clients that have different subscriptions with an electricity operator. The first group of consumer nodes contains outlets to which the vehicles of clients with a higher ranked subscription are connected, and the second group of consumer nodes contains outlets to which the vehicles belonging to clients with a lower ranked subscription are connected. The controller 100 is here configured to exclusively allot electric current to consumer nodes in the second subgroup after that each of the consumer nodes in the first subgroup has been allotted a respective maximum amount of electric current. Thus, it can be ensured that the clients with the higher ranked subscription obtain a best possible quality of service.

If the total amount of incoming electric current Is received via a root interface R is relatively low, the above strategy may result in that consumer nodes in the second subgroup receive very little electric current, if at all any. Therefore, it may be useful to arrange a respective queuing system within each of the at least first and second subgroups. Here, the first group of consumer nodes is generally prioritized over the second group of consumer nodes. However, the controller 100 is configured to allot electric current to at least one consumer node in the second group of consumer nodes while at least one consumer node in the first group of consumer nodes is compelled to wait before being allotted electric current. Then, the controller 100 is configured to allot electric current to at least one other consumer node in the second group of consumer nodes while at least one different consumer node in the first group of consumer nodes is compelled to wait, and so on.

It is not unusual that a vehicle is connected to a consumer node, which vehicle no longer requests any electric current. The consumer node to which such a vehicle is connected is categorized as a non-loading consumer node, which requests a zero amount of electric current. This categorization is beneficial, since it frees up capacity to be used by the other consumer nodes. However, typically, at a later point in time, also the non-loading consumer node may very well wish to receive electric current, for instance to warm up the driver's compartment and/or the engine of the vehicle, or to ensure that an onboard battery is fully charged before a scheduled departure. Therefore, according to one embodiment of the invention, the controller 100 is configured enable also non-loading consumer nodes to be allotted electric current. However, preferably, the controller 100 is configured to exclusively enable a non-loading consumer node to be allotted electric current if each of the consumer nodes except the at least one non-loading consumer node has already been allotted a respective maximum amount of electric current.

It is generally advantageous if the above-described procedure is effected in an automatic manner by executing one or more computer programs. Therefore, the controller 100 preferably includes processing circuitry and programmed memory units, the design of which will be briefly described below with reference to FIG. 1.

FIG. 1 shows a block diagram of the controller 100 according to one embodiment of the invention. The controller 100 includes processing circuitry in the form of at least one processor 123 and a memory unit 125, i.e. non-volatile data carrier, storing a computer program 127, which, in turn, contains software for making the at least one processor 123 execute the actions mentioned in this disclosure when the computer program 127 is run on the at least one processor 123.

In order to sum up, and with reference to the flow diagram in FIG. 4, we will now describe the computer-implemented method for dynamically distributing electric current to vehicles, which method is carried out by at least one processor in the controller 100.

In a first step 410, electric current is allotted to each node in the distribution network 150 according to a stepwise procedure that involves at least one allocation step per node in the distribution network 150. In each of the allocation steps an amount of electric current is allotted to the node, and the allocation continues until all of the total amount of incoming electric current has been allotted, or at least one threshold criterion is fulfilled, which may mean that each of the consumer nodes has been allotted a respective maximum amount of electric current.

A subsequent step 420 checks if at least one of the consumer nodes, at this point in time, requests a lower amount of electric current than what has already been allotted to that consumer node. If so, a step 430 follows and otherwise the procedure continues to a step 440.

In step 430, said at least one consumer node, which request(s) amount(s) of electric current below what has been allotted to it/them is/are allotted decreased amount(s) of current equal to what it/they now request(s).

Then, step 440 follows, which checks if an updating timer has expired, which updating timer represents a delay between consecutive checking if one or more consumer nodes has decreased its requested amount of electric current. The procedure stays in step 440 until the updating timer expires, whereafter the procedure loops back to step 420.

All of the process steps, as well as any sub-sequence of steps, described with reference to FIG. 4 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. The term does not preclude the presence or addition of one or more additional elements, features, integers, steps or components or groups thereof. The indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

Variations to the disclosed embodiments can be understood and effected by those skilled in the art in practicing the claimed invention, from a study of the drawings, the disclosure, and the appended claims.

The invention is not restricted to the described embodiments in the figures, but may be varied freely within the scope of the claims.

The invention claimed is:

1. A controller for dynamically distributing electric current to vehicles which each is connected to a respective consumer node in a distribution network to which a total amount of incoming electric current received via a root interface, the distribution network comprising a set of intermediate nodes being hierarchically organized in a topmost level including at least one node configured to receive electric current directly from the root interface and at least one subordinated level including at least one node configured to receive electric current from a node at the topmost level, or a node at a higher subordinated level, wherein the controller is configured to:

allot electric current to each node in the distribution network according to a stepwise procedure involving at least one allocation step per node in the distribution network, wherein in each of the at least one allocation step, an amount of electric current is allotted to the node;

continue the stepwise procedure until all of the total amount of electric current has been allotted or at least one threshold criterion is fulfilled;

reassess, repeatedly, a respective amount of electric current requested by each of the consumer nodes; and if for a particular consumer node, a requested amount of electric current is lower than an amount of electric current allotted to the node, decrease the amount of electric current allotted to the particular consumer node to the amount of electric current requested by that node, wherein the consumer nodes constitute a lowest subordinated level in the distribution network, and the controller is further configured to effect the stepwise procedure by:

starting at the root interface;

traversing from the root interface to a first node at the topmost level;

continuing traversing from the first node at the topmost level to a first node at each subordinated level below the topmost level until reaching the lowest subordinated level in the distribution network; and allotting a first predefined amount of electric current to a first node at the lowest subordinated level below the first node at the topmost level, wherein the controller is further configured to effect the stepwise procedure by, after having allotted the first predefined amount of electric current to the first node at the lowest subordinated level below the first node at the topmost level performing the steps:

(a) returning to the root interface;

(b) traversing from the root interface to a first previously not traversed node at the topmost level;

(c) continuing traversing from the first previously not traversed node at the topmost level to a respective first previously not traversed node at each subordinated level below the topmost level until reaching the lowest subordinate level; and (d) allotting another round of the first predefined amount of electric current to a first node at the lowest subordinated level below the first previously not traversed node at the topmost level.

2. The controller according to claim 1 being further configured to effect the stepwise procedure by, after having allotted said another round of the predefined amount of electric current to the first node at the lowest subordinated level below the first previously not traversed node at the topmost level:

repeating the steps (a) to (d) until each node at the lowest subordinated level has been allotted the first predefined amount of electric current.

3. The controller according to claim 2 being further configured to effect the stepwise procedure by, after having allotted the first predefined amount of electric current to each node at the lowest subordinated level, returning to the root interface;

traversing from the root interface to the first node at the topmost level;

continuing traversing from the first node at the topmost level to a first node at each subordinated level below the topmost level until reaching the lowest subordinated level; and allotting an increased amount of electric current to the first node at the lowest subordinated level below the first node at the topmost level.

4. The controller according to claim 3 being further configured to effect the stepwise procedure by, after having allotted the increased amount of electric current to the first node at the lowest subordinated level below the first node at the topmost level performing the steps:

(i) returning to the root interface;

(ii) traversing from the root interface to a first previously not traversed node at the topmost level;

(iii) continuing traversing from the first previously not traversed node at the topmost level to a respective first previously not traversed node at each subordinated level below the topmost level until reaching the lowest subordinated level; and (iv) allotting the increased amount of electric current to a first node at the lowest subordinated level below the first previously not traversed node at the topmost level, and repeating the steps (i) to (iv) until:

a sum of electric current allotted to the consumer nodes is equal to the total amount of incoming electric current, or the at least one of the threshold criterion is fulfilled by such an amount of electric current has been allotted to at least one of the consumer nodes that at least one node at the least one subordinated level has reached a capacity limit for an amount of electric current being possible to transfer through that node, and/or each of the consumer nodes has been allotted a respective maximum amount of electric current.

5. The controller according to claim 1, wherein the consumer nodes comprises first and second subgroups, and the controller is configured to exclusively allot electric current to the consumer nodes in the second subgroup after each of the consumer nodes in the first subgroup has been allotted a respective maximum amount of electric current.

6. A controller for dynamically distributing electric current to vehicles which each is connected to a respective consumer node in a distribution network to which a total amount of incoming electric current received via a root interface, the distribution network comprising a set of intermediate nodes being hierarchically organized in a topmost level including at least one node configured to receive electric current directly from the root interface and at least one subordinated level including at least one node configured to receive electric current from a node at the topmost level, or a node at a higher subordinated level, wherein the controller is configured to:

allot electric current to each node in the distribution network according to a stepwise procedure involving at least one allocation step per node in the distribution network, wherein in each of the at least one allocation step, an amount of electric current is allotted to the node;

continue the stepwise procedure until all of the total amount of electric current has been allotted or at least one threshold criterion is fulfilled;

reassess, repeatedly, a respective amount of electric current requested by each of the consumer nodes; and if for a particular consumer node, a requested amount of electric current is lower than an amount of electric current allotted to the node, decrease the amount of electric current allotted to the particular consumer node to the amount of electric current requested by that node, and wherein, before allotting electric current to a node in the set of nodes, the controller is configured to execute a prioritizing procedure according to which a vehicle comprising an electric load in the form of an engine heater is given priority over a vehicle comprising an electric load in the form of a rechargeable battery.

7. The controller according to claim 6, wherein the prioritizing procedure further involves giving priority to a vehicle that has not yet been allotted electric current during a predetermined period of time over a vehicle that has already been allotted electric current during the predetermined period of time.

8. A controller for dynamically distributing electric current to vehicles which each is connected to a respective consumer node in a distribution network to which a total amount of incoming electric current received via a root interface, the distribution network comprising a set of intermediate nodes being hierarchically organized in a topmost level including at least one node configured to receive electric current directly from the root interface and at least one subordinated level including at least one node configured to receive electric current from a node at the topmost level, or a node at a higher subordinated level, wherein the controller is configured to:

allot electric current to each node in the distribution network according to a stepwise procedure involving at least one allocation step per node in the distribution network, wherein in each of the at least one allocation step, an amount of electric current is allotted to the node;

continue the stepwise procedure until all of the total amount of electric current has been allotted or at least one threshold criterion is fulfilled;

reassess, repeatedly, a respective amount of electric current requested by each of the consumer nodes; and if for a particular consumer node, a requested amount of electric current is lower than an amount of electric current allotted to the node, decrease the amount of electric current allotted to the particular consumer node to the amount of electric current requested by that node, and wherein the consumer nodes comprises at least one non-loading consumer node that has requested a zero amount of electric current, and the controller is configured to exclusively enable the at least one non-loading consumer node to be allotted electric current if each of the consumer nodes except the at least one non-loading consumer node has been allotted a respective maximum amount of electric current.

9. A computer-implemented method for dynamically distributing electric current to vehicles which each is connected to a respective consumer node in a distribution network to which a total amount of incoming electric current received via a root interface, the distribution network comprising a set of intermediate nodes being hierarchically organized in a topmost level including at least one node configured to receive electric current directly from the root interface and at least one subordinated level including at least one node configured to receive electric current from a node at the topmost level, or a node at a higher subordinated level, which method is performed in at least one processor and comprises:

allotting electric current to each node in the distribution network according to a stepwise procedure involving at least one allocation step per node in the distribution network, wherein in each of the at least one allocation step an amount of electric current is allotted to the node;

continuing the stepwise procedure until all of the total amount of electric current has been allotted or at least one threshold criterion is fulfilled;

reassessing, repeatedly, a respective amount of electric current requested by each of the consumer nodes; and if for a particular consumer node, a requested amount of electric current is lower than an amount of electric current allotted to the node, decreasing the amount of electric current allotted to the particular consumer node to the amount of current requested by that node, wherein the consumer nodes constitute a lowest subordinated level in the distribution network, and the method effects the stepwise procedure by:

starting at the root interface;

traversing from the root interface to a first node at the topmost level;

continuing traversing from the first node at the topmost level to a first node at each subordinated level below the topmost level until reaching the lowest subordinated level in the distribution network; and allotting a first predefined amount of electric current to a first node at the lowest subordinated level below the first node at the topmost level, wherein the method is further configured to effect the stepwise procedure by, after having allotted the first predefined amount of electric current to the first node at the lowest subordinated level below the first node at the topmost level performing the steps:

(a) returning to the root interface;

(b) traversing from the root interface to a first previously not traversed node at the topmost level;

(c) continuing traversing from the first previously not traversed node at the topmost level to a respective first previously not traversed node at each subordinated level below the topmost level until reaching the lowest subordinate level; and (d) allotting another round of the first predefined amount of electric current to a first node at the lowest subordinated level below the first previously not traversed node at the topmost level.

10. The method according to claim 9, further comprising effecting the stepwise procedure by, after having allotted said another round of the predefined amount of electric current to the first node at the lowest subordinated level below the first previously not traversed node at the topmost level:

repeating the steps (a) to (d) until each node at the lowest subordinated level has been allotted the first predefined amount of electric current.

11. The method according to claim 10, further comprising effecting the stepwise procedure by, after having allotted the first predefined amount of electric current to each node at the lowest subordinated level, returning to the root interface;

traversing from the root interface to the first node at the topmost level;

continuing traversing from the first node at the topmost level to a first node at each subordinated level below the topmost level until reaching the lowest subordinated level; and allotting an increased amount of electric current to the first node at the lowest subordinated level below the first node at the topmost level.

12. The method according to claim 11 further comprising effecting the stepwise procedure by, after having allotted the increased amount of electric current to the first node at the lowest subordinated level below the first node at the topmost level performing the steps:

(i) returning to the root interface;

(ii) traversing from the root interface to a first previously not traversed node at the topmost level;

(iii) continuing traversing from the first previously not traversed node at the topmost level to a respective first previously not traversed node at each subordinated level below the topmost level until reaching the lowest subordinated level; and (iv) allotting the increased amount of electric current to a first node at the lowest subordinated level below the first previously not traversed node at the topmost level; and repeating the steps (i) to (iv) until:

a sum of electric current allotted to the consumer nodes is equal to the total amount of incoming electric current, or the at least one of the threshold criterion is fulfilled by such an amount of electric current has been allotted to at least one of the consumer nodes that at least one node at the least one subordinated level has reached a capacity limit for an amount of electric current being possible to transfer through that node, and/or each of the consumer nodes has been allotted a respective maximum amount of electric current.

13. The method according to claim 9, wherein the consumer nodes comprises first and second subgroups, and the method comprises:

exclusively allotting electric current to the consumer nodes in the second subgroup after each of the consumer nodes in the first subgroup has been allotted a respective maximum amount of electric current.

14. A computer-implemented method for dynamically distributing electric current to vehicles which each is connected to a respective consumer node in a distribution network to which a total amount of incoming electric current received via a root interface, the distribution network comprising a set of intermediate nodes being hierarchically organized in a topmost level including at least one node configured to receive electric current directly from the root interface and at least one subordinated level including at least one node configured to receive electric current from a node at the topmost level, or a node at a higher subordinated level, which method is performed in at least one processor and comprises:

allotting electric current to each node in the distribution network according to a stepwise procedure involving at least one allocation step per node in the distribution network, wherein in each of the at least one allocation step an amount of electric current is allotted to the node;

continuing the stepwise procedure until all of the total amount of electric current has been allotted or at least one threshold criterion is fulfilled;

reassessing, repeatedly, a respective amount of electric current requested by each of the consumer nodes; and if for a particular consumer node, a requested amount of electric current is lower than an amount of electric current allotted to the node, decreasing the amount of electric current allotted to the particular consumer node to the amount of current requested by that node, and wherein, before allotting electric current to a node in the set of nodes, the method comprises executing a prioritizing procedure according to which a vehicle comprising an electric load in the form of an engine heater is given priority over a vehicle comprising an electric load in the form of a rechargeable battery.

15. The method according to claim 14, wherein the prioritizing procedure further involves giving priority to a vehicle that has not yet been allotted electric current during a predetermined period of time over a vehicle that has already been allotted electric current during the predetermined period of time.

16. A computer-implemented method for dynamically distributing electric current to vehicles which each is connected to a respective consumer node in a distribution network to which a total amount of incoming electric current received via a root interface, the distribution network comprising a set of intermediate nodes being hierarchically organized in a topmost level including at least one node configured to receive electric current directly from the root interface and at least one subordinated level including at least one node configured to receive electric current from a node at the topmost level, or a node at a higher subordinated level, which method is performed in at least one processor and comprises:

allotting electric current to each node in the distribution network according to a stepwise procedure involving at least one allocation step per node in the distribution network, wherein in each of the at least one allocation step an amount of electric current is allotted to the node;

continuing the stepwise procedure until all of the total amount of electric current has been allotted or at least one threshold criterion is fulfilled;

reassessing, repeatedly, a respective amount of electric current requested by each of the consumer nodes; and if for a particular consumer node, a requested amount of electric current is lower than an amount of electric current allotted to the node, decreasing the amount of electric current allotted to the particular consumer node to the amount of current requested by that node, and wherein the consumer nodes comprises at least one non-loading consumer node that has requested a zero amount of electric current, and the method comprises exclusively enabling electric current to be allotted to the at least one non-loading consumer node if each of the consumer nodes except the at least one non-loading consumer node has been allotted a respective maximum amount of electric current.

17. A computer program product comprising computer program code stored on a non-transitory computer-readable medium, said computer program product configured for dynamically distributing electric current to vehicles which each is connected to a respective consumer node in a distribution network to which a total amount of incoming electric current received via a root interface, the distribution network comprising a set of intermediate nodes being hierarchically organized in a topmost level including at least one node configured to receive electric current directly from the root interface and at least one subordinated level including at least one node configured to receive electric current from a node at the topmost level, or a node at a higher subordinated level, said computer program code comprising computer instructions to cause at least one processing unit to perform the following operations:

allotting electric current to each node in the distribution network according to a stepwise procedure involving at least one allocation step per node in the distribution network, wherein in each of the at least one allocation step an amount of electric current is allotted to the node;

continuing the stepwise procedure until all of the total amount of electric current has been allotted or at least one threshold criterion is fulfilled;

reassessing, repeatedly, a respective amount of electric current requested by each of the consumer nodes; and if for a particular consumer node, a requested amount of electric current is lower than an amount of electric current allotted to the node, decreasing the amount of electric current allotted to the particular consumer node to the amount of current requested by that node, wherein the consumer nodes constitute a lowest subordinated level in the distribution network, and said computer program code further comprises computer instructions to cause the at least one processing unit to effect the stepwise procedure by:

starting at the root interface;

traversing from the root interface to a first node at the topmost level;

continuing traversing from the first node at the topmost level to a first node at each subordinated level below the topmost level until reaching the lowest subordinated level in the distribution network; and allotting a first predefined amount of electric current to a first node at the lowest subordinated level below the first node at the topmost level, wherein said computer program code further comprises computer instructions to cause the at least one processing unit to effect the stepwise procedure by, after having allotted the first predefined amount of electric current to the first node at the lowest subordinated level below the first node at the topmost level performing the steps:

(a) returning to the root interface;

(b) traversing from the root interface to a first previously not traversed node at the topmost level;

(c) continuing traversing from the first previously not traversed node at the topmost level to a respective first previously not traversed node at each subordinated level below the topmost level until reaching the lowest subordinate level; and (d) allotting another round of the first predefined amount of electric current to a first node at the lowest subordinated level below the first previously not traversed node at the topmost level.

\*    \*    \*    \*    \*